(12) United States Patent
Pfister

(10) Patent No.: US 6,431,511 B1
(45) Date of Patent: Aug. 13, 2002

(54) MULTIPLE POSITION DISPLAY MOUNT FOR A COMPUTER OR THE LIKE

(75) Inventor: Peter W. Pfister, South Lyon, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 59 days.

(21) Appl. No.: 09/776,868

(22) Filed: Feb. 5, 2001

(51) Int. Cl.[7] ............................................... E04G 3/00
(52) U.S. Cl. .............................. 248/274.1; 248/284.1; 248/447.1; 248/919
(58) Field of Search .................. 248/447, 447.1, 248/454, 274.1, 284.1, 917, 918, 919, 921; 361/681, 683; 345/7; 138/162, 92

(56) References Cited

U.S. PATENT DOCUMENTS

| | | | | |
|---|---|---|---|---|
| 5,108,063 A | * | 4/1992 | Koerber, Sr. et al. | 248/284.1 |
| 5,275,482 A | * | 1/1994 | Grant | 312/235.9 |
| 5,622,419 A | * | 4/1997 | Holder et al. | 353/119 |
| 5,865,414 A | * | 2/1999 | Beitzel | 248/447 |
| 6,000,663 A | * | 12/1999 | Plasse et al. | 248/447 |
| 6,075,502 A | * | 6/2000 | McDowall et al. | 345/7 |
| 6,256,193 B1 | * | 7/2001 | Janik et al. | 361/683 |

* cited by examiner

Primary Examiner—Leslie A. Braun
Assistant Examiner—Tan Le
(74) Attorney, Agent, or Firm—David L. Kuhn; Clifford C. Carter; Gail S. Soderling

(57) ABSTRACT

A device for mounting a computer or similar article can hold the article in a plurality of orientations. The device has a mounting plate fixed to structural element such as a post, and has a frame plate that hinges to the mounting plate. The article attaches to the frame plate and swings therewith from a retracted position where the frame plate lies along the mounting plate. The article and frame plate can be swung to a deployed position where the frame plate is tilted away from the mounting plate. A slide member connected to the frame plate translates thereon as the plate swings between the retracted and deployed positions. A guide plate is hinged to the slide member and the mounting plate to control translation of the slide. A latch on the frame plate selectively engages an orifice in the mounting plate or a specially designed slot in the slide member so as to lock the frame member in either the retracted or the deployed position.

7 Claims, 4 Drawing Sheets

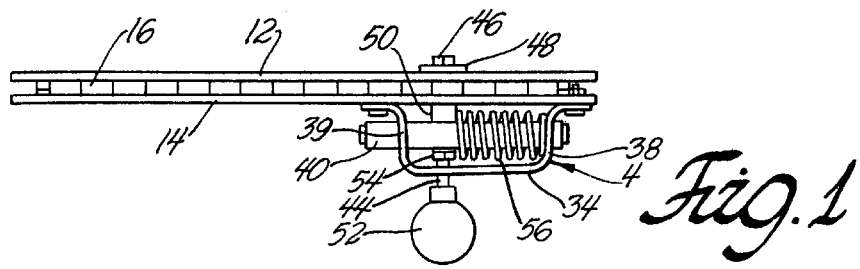
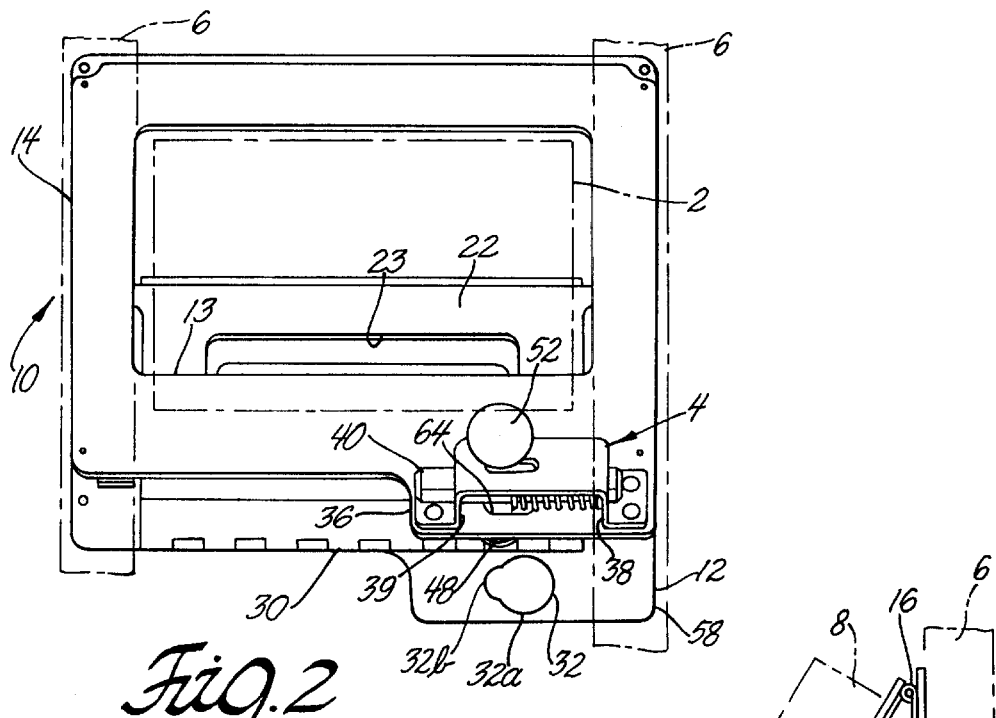
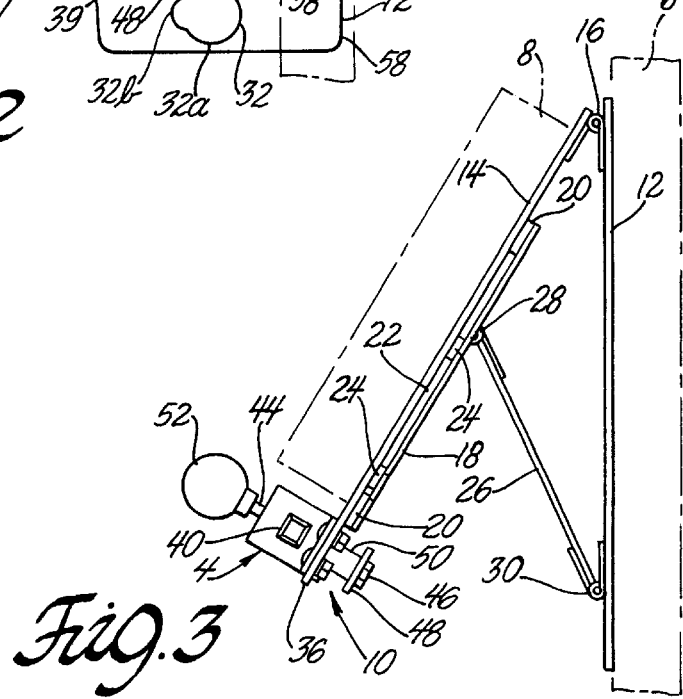

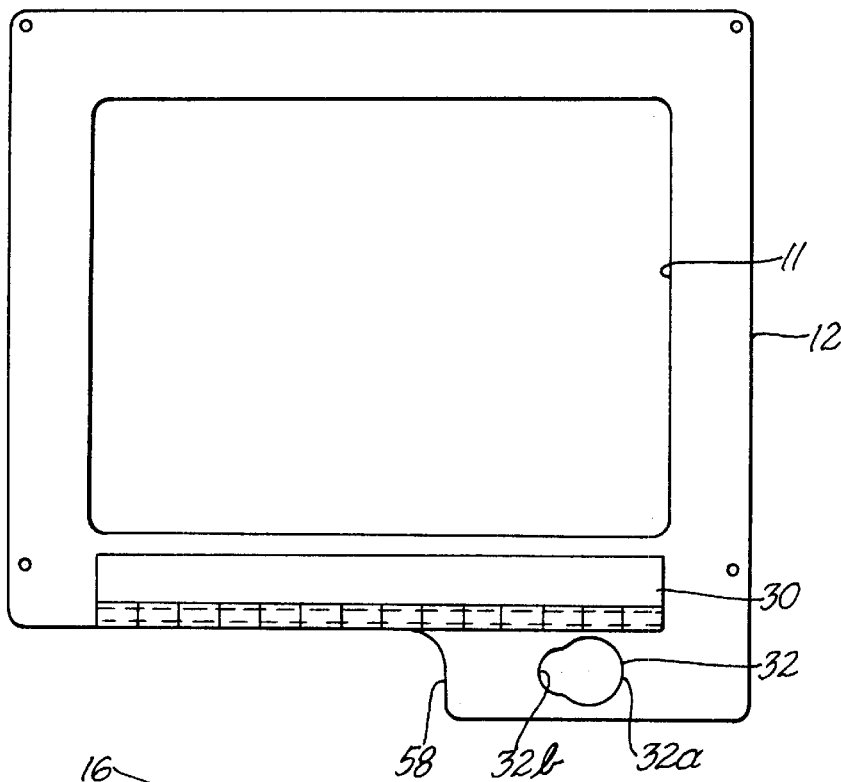
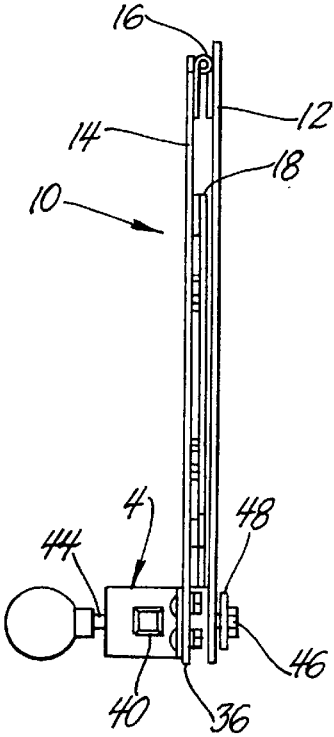
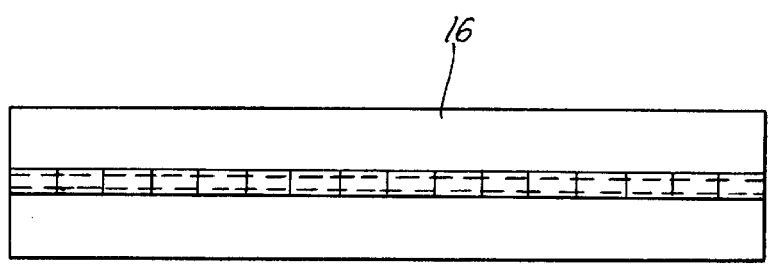

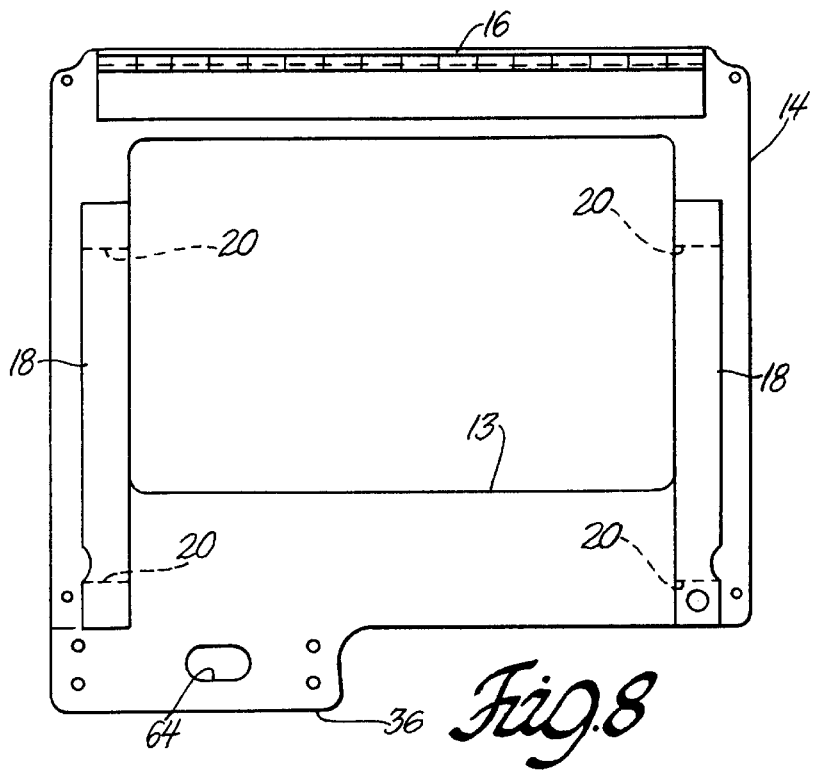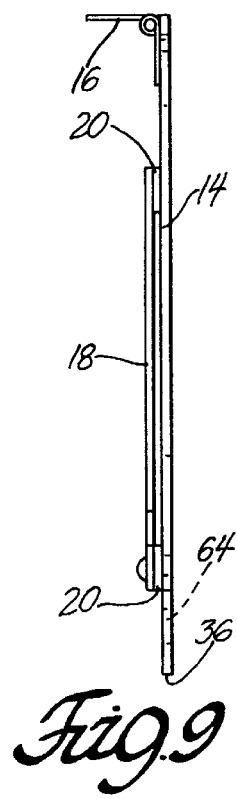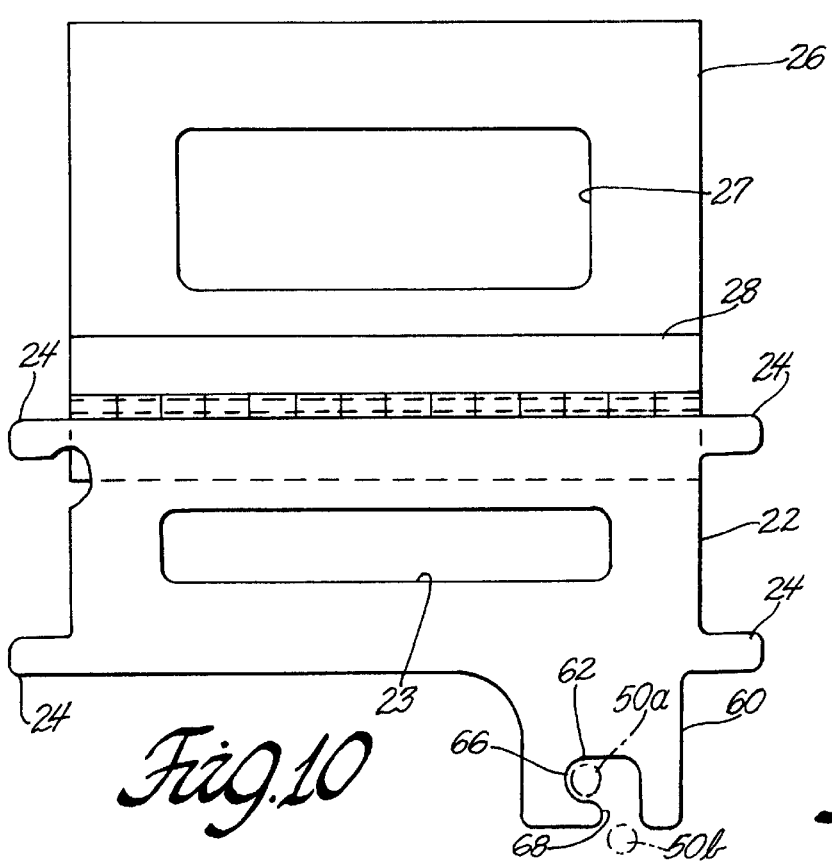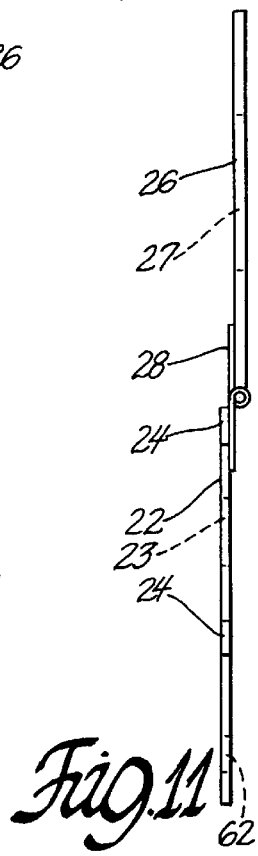

MULTIPLE POSITION DISPLAY MOUNT FOR A COMPUTER OR THE LIKE

GOVERNMENT USE

The invention described here may be made, used and licensed by the or for the U.S. Government for governmental purposes without paying me any royalty.

BACKGROUND AND SUMMARY

Modem combat vehicles have numerous computers, view screens or similar equipment that display tactical information or information about the condition of the vehicle. Especially in dynamic battlefield scenarios, it is critical that the crew of the vehicle have a clear view of this equipment. A particular problem exists when MIA1 Combat Tank commanders change from a sitting position within the tank's turret to a standing position where the commander's upper torso is outside the turret. When sitting, the commander can easily see a computer display mounted vertically on the inner turret wall. But the commander can not see this display clearly when he is standing unless the display is oriented at 30 degrees from its normal vertical position an the turret wall.

To address the foregoing particular problem, and to address the other situations when crew members move in a combat vehicle, I have invented a versatile mount for computers and like equipment. The mount allows the commander's computer to be swung out from a vertical position when the commander stands and allows like equipment to be reoriented when other crew members move. The mount collapses to a flat, compact configuration that sandwiches closely between the commander's computer and the turret wall when the computer is oriented vertically. This creates more space for the commander when he is sitting in the turret. The mount includes a quick-action latch, which permits the commander to quickly unlock the computer from one position move it to a new position and re-lock it in the new position.

The mount comprises a mounting plate attached to a bracket or other structural member fixed to the turret wall. Hinged to the mounting plate is a frame plate, which holds the commander's computer, so that the computer swings with the frame plate. Between the mounting plate and the frame plate is a guide, one edge of the guide being hinged to the mounting plate. An opposite edge of the guide is hinged to a slide that can be translated on the frame member. The guide translates the slide in concert with the swing of the frame plate. The quick-action latch engages an orifice in the mounting plate to lock the frame plate in place during a vertical, or retracted position of the frame plate. The latch engages a slot in the slide to lock the frame plate in place during the swung-out, deployed position.

BRIEF DESCRIPTION OF THE DRAWINGS

FIG. 1 is a top view of the mount during the retracted configuration of the mount.

FIG. 2 is a front view of the mount in the deployed position.

FIG. 3 is a side view of the mount in the deployed position.

FIG. 4 is a front view of a mounting plate with a hinge attached.

FIG. 5 is a side view of the mounting plate and hinge shown in FIG. 4.

FIG. 6 is a side view of the mount in a retracted position.

FIG. 7 shows one of the hinges used in constructing the mount, that hinge being typical of all the hinges used for the mount.

FIG. 8 is a rear view of a frame plate of the mount, together with guide strips and a hinge fixed to the plate.

FIG. 9 is a side view of the frame plate, hinge and strips seen in FIG. 8.

FIG. 10 is a plan view of a guide and a slide of the mount connected by a hinge.

FIG. 11 is a side view of the guide, slide and hinge shown in FIG. 10.

DETAILED DESCRIPTION

Figure 12:
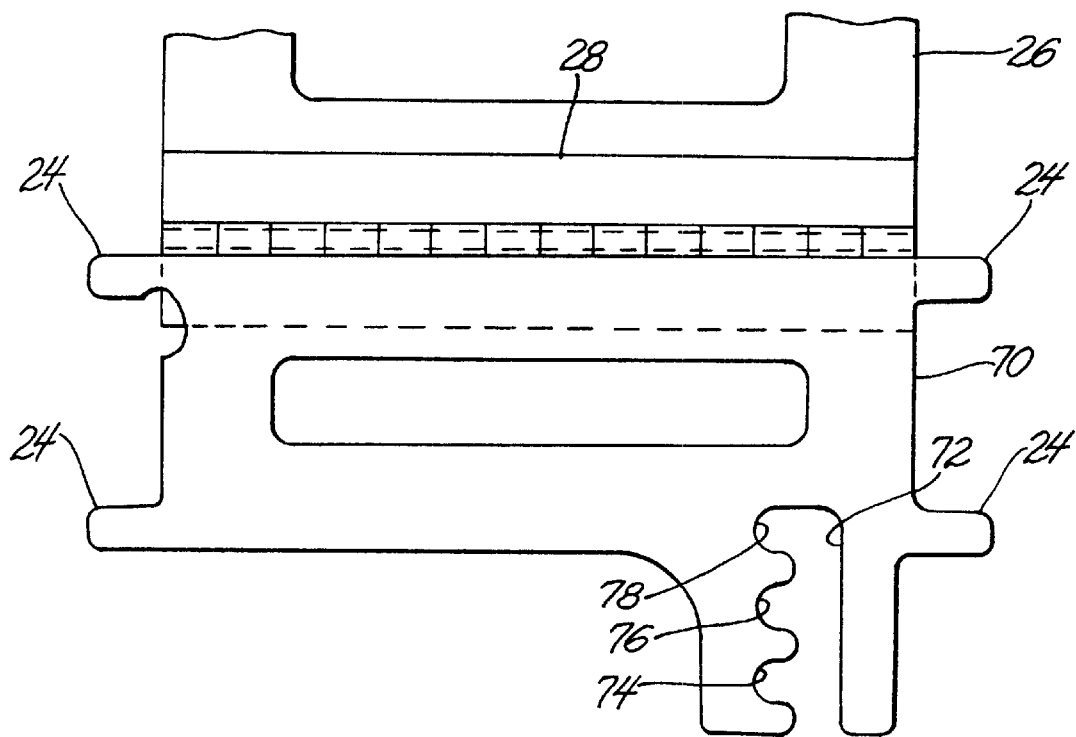
FIG. 12 shows an alternate embodiment of the guide.

FIGS. 2 and 3 show views of the multiple position mount 10 from the front and side, respectively. FIG. 3 shows a computer 8 or like device affixed to mount 10, whose mounting plate 12 is fixed by any known, suitable means to a structural brackets or posts 6. Mount 10 is in the deployed position, where plate 14 is preferably swung 30 degrees out from plate 12, which is oriented vertically. Frame plate 14 is attached to mounting plate 12 by hinge 16, whereby plate 14 can swing toward plate 12 to a closed position (FIG. 6). As can be seen in conjunction with FIGS. 8 and 9, frame plate 14 has a pair of rigid strips 18 attached along either side, the strips spaced from plate 14 by flat blocks 20. A slide 22, also seen in FIG. 10, has four tabs 24, which project into the longitudinal gap between strips 18 and plate 14, whereby slide is held adjacent to plate 14 as it translates along strips 18. A plate-like guide 26 is connected between mounting plate 12 and slide 22 by hinges 28 and 30, which are similar in structure to hinge 16. Guide 26 and hinge 28 are shown more fully in FIGS. 10 and 11.

It should be noted that the hinges, plates, guide and slide are arranged such that strips 18 contact mounting plate 12 during the closed position of plate 14. At the same time, guide 26, hinge 28 and hinge 30 lie between the strips. This arrangement of elements thus has a maximum thinness during the closed position. It should also be noted that windows 11, 13, 23 and 27 are provided respectively in plate 12, plate 14, slide 22 and guide 26. These windows not only reduce weight of the respective elements but also allow cooling air from ventilation duct 2 (FIG. 2) to flow through mount 10 to computer 8.

Mounted to plate 14 is a latch designated generally as 4. As will be explained in greater detail below, latch 4 engages slide 22 during the FIG. 3 position of mount 10 so as to lock the mount in that position. When changing mount 10 to the FIG. 6, retracted position, latch releases slide 22. Then slide 22 translates upward away from latch 4 as plate 14 swings to plate 12. Latch 4 then engages orifice 32 in plate 12 to lock mount 10 in the retracted position Latch 4 includes a bracket 34 affixed to a flange 36 at the bottom edge of frame plate 14. Extending through the two legs 38 and 39 of bracket 34 is a translatable shaft 40, which has a square cross section and beveled ends, the legs defining square orifices that fit with shaft 40. The portion of bracket 34 between the legs defines an oval orifice 42. This orifice accommodates shank 44 of an elongate threaded member such as a bolt or screw 46, which also passes through shaft 40. Encircling screw 46 and fixed adjacent to the head thereof is a flat locking member in the form of a disk 48. The disk is smaller in diametrical width than a radially larger portion 32*a* of orifice 32 but is larger in width than a radially smaller portion 32*b* of orifice 32. A cylindrical collar 50 on screw 46 spans the distance between disk 48 and shaft 40. Screw 46 passes through collar 50, shaft 40 and orifice 42 of bracket 34 and terminates in a threading engagement with knob 52. A nut 54 on screw 46 is tightened against shaft 40 to keep collar 50 and disk 48 in fixed axial positions relative to the screw. A coil spring 56 encircles shaft 40 between leg 38 and collar 50. The spring biases the assembly comprised of shaft 40, screw 46, disk 48, collar 50 and knob 52 away from leg 38 toward leg 39.

Mounting plate 12, framing plate 14, slide 22 and bracket 34 all have apertures or slots to accommodate lateral motion of screw 46 and the elements thereon, including disk 48 and collar 50. Framing plate 14 and bracket 34 have respective oval orifices 64 and 42 which accommodate this lateral motion.

As mentioned previously, mounting plate 12 has orifice 32 with a radially larger portion 32*a* and a radially smaller portion 32*b*. This orifice is in flange 58 that aligns with the similar flange 36 on framing plate 14. When plate 12 is swung from its FIG. 3, open position to its FIG. 6, closed position, a human user first pushes knob 52 laterally, away from bracket leg 39. As plate 12 reaches plate 14, disk 48 passes through radially larger portion 32*a* and the user releases the knob. The bias of spring 56 results in disk 48 being shifted laterally, toward leg 39, so that disk 48 registers with radially smaller portion 32*b*. Disk 48 is too large to pass through radially smaller portion 32*b*, whereby framing plate 14 is locked in its closed position.

Slide 22 has a flange 60 that aligns with the other flanges, 36 and 58, during the retracted configuration of mount 10. Flange 60 defines a slot 62 that aligns with orifice 32 in mounting plate 12 and an oval orifice 64 in framing plate 14. Slot 62 forms a right angle bend, has an indentation at closed end 66 and has an open end at 68. When plate 14 is swung from its FIG. 6, closed position to its FIG. 3, open position, a human user first pushes knob 52 laterally. This causes collar 50, which extends through slot 62, to move away from closed end 66 and align with open end 68. As the user swings plate 14 away from plate 12, slide 22 lifts such that collar 50 exits the slot through open end 68. In FIG. 10, reference numeral 50*a* designates the position of the collar when plate 14 is in the closed position and numeral 50*b* designates the position of the collar as it exits slot 62.

FIG. 12 shows an alternate embodiment 70 of slide 22, slide 70 being the same as slide 22 except that serrated slot 72 replaces slot 62. Slot 72 defines indentations 74, 76 and 78 analogous to the indentation at closed end 66 of slot 62. One of the indentations in slot 72 retains collar 50 when plate 14 is swung away from plate 12. Plate 14 will be swung out least when collar 50 is in indentation 74 and will be swung out most when collar 50 is in indentation 78. Any number of indentations can be provided, depending on how many swung-out positions for plate 14 are desired.

I wish it understood that I do not desire to be limited to the exact details of construction or method shown herein since obvious modifications will occur to those skilled in the relevant arts without departing from the spirit and scope of the following claims.

What is claimed is:

1. A device for mounting an article to a structural element so the article can be swung from one juxtaposition to another juxtaposition relative to the structural element, the device comprising:

a mounting member fixed to the structural element;

a first orifice defined by the mounting member;

a frame member holding the article and connecting to the mounting member, the frame member having a retracted position where it lies along the mounting member and a deployed position where it is swung out from the mounting member;

a second orifice defined by the frame member;

a slide member in sliding contact with the frame member;

a slot defined by the slide member;

means for retaining the slide member in the sliding contact with the frame member;

a guide member connected between the slide member and the mounting member, the guide translating the slide member in concert with motion of the frame member;

a latch mounted to the frame member;

an elongate member of the latch passing through the second orifice;

wherein the slot and first orifice lie in a swing path of the elongate member; and means for retaining the elongate member in the first orifice during the retracted position and for retaining the elongate member in the slot during the deployed position.

2. The device of claim 1 wherein the retaining means comprises:

rigid strips affixed to the frame member;

elongate gaps defined between the strips and the frame member, the gaps disposed along the strips; and tabs of the slide member received in the gap in sliding contact with the strips.

3. A device for mounting an article to a structural element so the article can be swung from one juxtaposition to another juxtaposition relative to the structural element, the device comprising:

a mounting member fixed to the structural element;

a first orifice defined by the mounting member, the first orifice having one orifice portion larger than another orifice portion;

a frame member holding the article and connecting to the mounting member, the frame member having a retracted position where it lies along the mounting member and a deployed position where it is swung out from the mounting member;

a second orifice defined by the frame member;

a slide member in sliding contact with the frame member;

a slot defined by the slide member, the slot having an open end and an indentation remote from the open end;

means for retaining the slide member in the sliding contact with the frame member;

a guide member connected between the slide member and the mounting member;

a latch mounted to the frame member;

an elongate member of the latch passing through the second orifice;

a locking member of the latch connected to the elongate member, the locking member having a width smaller than the one orifice and larger than the other orifice;

wherein the slot and first orifice lie in a swing path of the elongate member; and means for retaining the elongate member in the one orifice portion during the retracted position and for retaining the elongate member in the indentation during the deployed position.

4. The device of claim 3 wherein the retaining means includes a means for biasing the elongate member toward the one orifice portion during the retracted position and biasing the elongate member toward the indentation during the deployed position.

5. A device for mounting an article to a structural element so the article can be swung from one juxtaposition to another juxtaposition relative to the structural element, thereby reorienting the article to suit the needs of a human viewer of the article, the device comprising:

a generally planar mounting member fixed to the structural element;

a first orifice defined by the mounting member, the first orifice having one orifice portion larger than another orifice portion;

a generally planar frame member holding the article and hinged to the mounting member, the frame member having a retracted position where it lies along the mounting, member and a deployed position where it is swung out from the mounting member;

a second orifice defined by the frame member;

a generally planar slide member in sliding contact with the frame member;

a slot defined by the slide member, the slot having an open end and an indentation remote from the open end;

means for retaining the slide member in the sliding contact with the frame member;

a generally planar guide member hinged between the slide member and the mounting member;

a latch mounted to the frame member;

an elongate member of the latch passing through the second orifice;

a locking member of the latch connected to the elongate member, the locking member having a width smaller than the one orifice and larger than the other orifice;

wherein the slot and first orifice lie in a swing path of the elongate member; and means for retaining the elongate member in the one orifice portion during the retracted position and for retaining the elongate member in the indentation during the deployed position.

6. The device of claim 5 further including means for allowing air flow through the device to the article.

7. The device of claim 6 wherein the mounting member, frame member, guide member, slide member and retaining means comprise a flat, compacted structure during the retracted position.

* * * * *